Sept. 13, 1960     H. O. OLSON     2,952,067
GEAR FINISHING MACHINE AND METHOD
Filed May 26, 1954     3 Sheets-Sheet 1
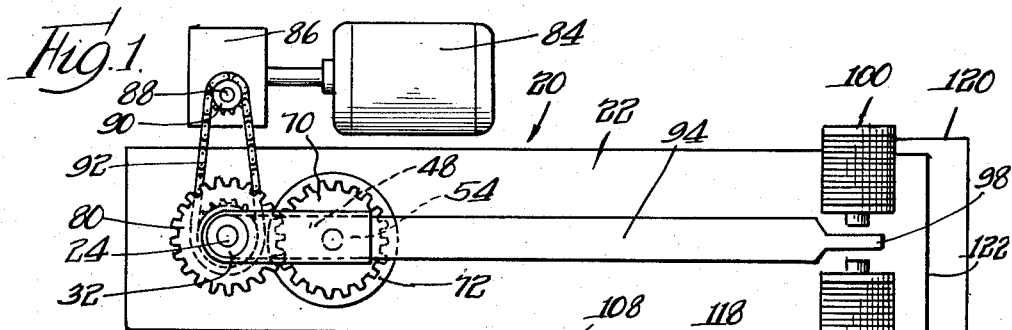
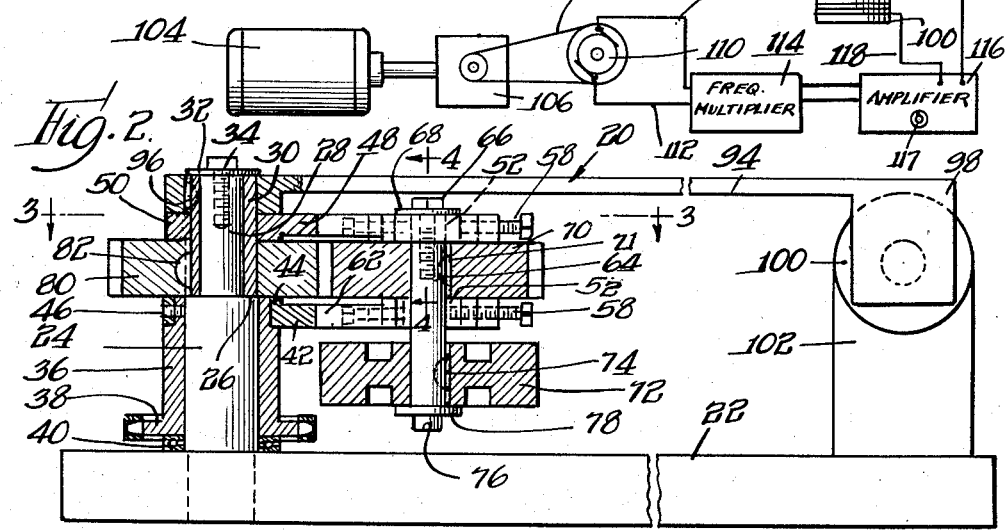
INVENTOR.
Herbert O. Olson
BY
Olson & Trexler
attys Sept. 13, 1960   H. O. OLSON   2,952,067
GEAR FINISHING MACHINE AND METHOD
Filed May 26, 1954   3 Sheets-Sheet 2
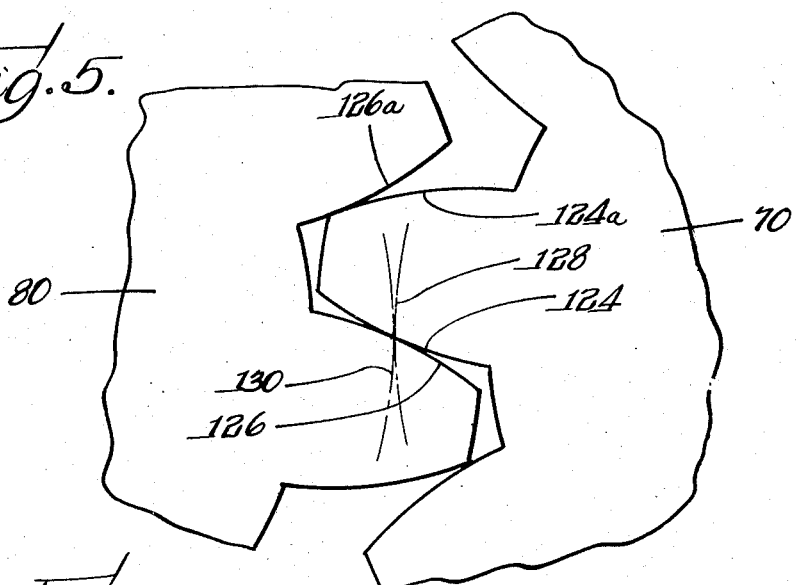
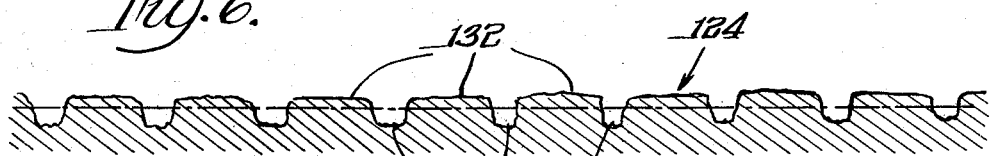
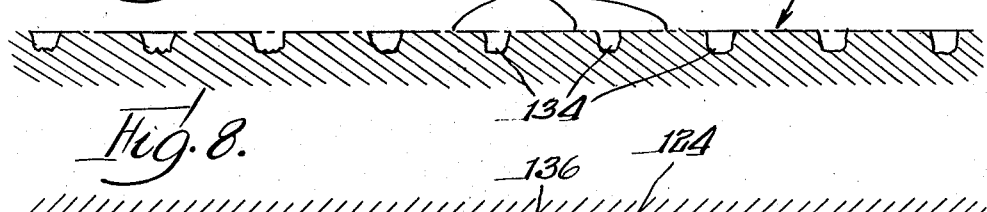
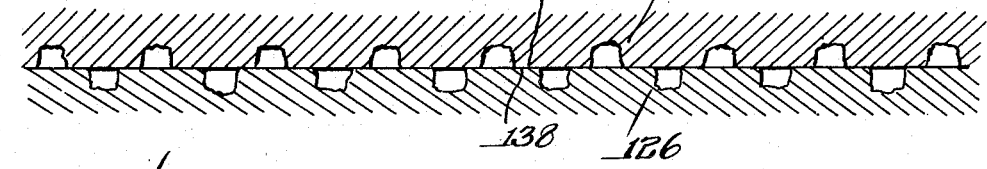
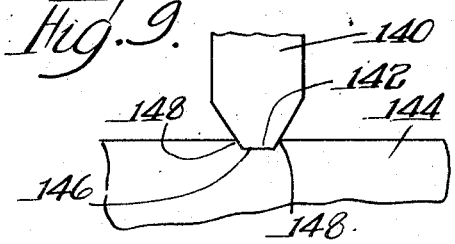
INVENTOR.
Herbert O. Olson
BY
Olson & Trexler
Attys.

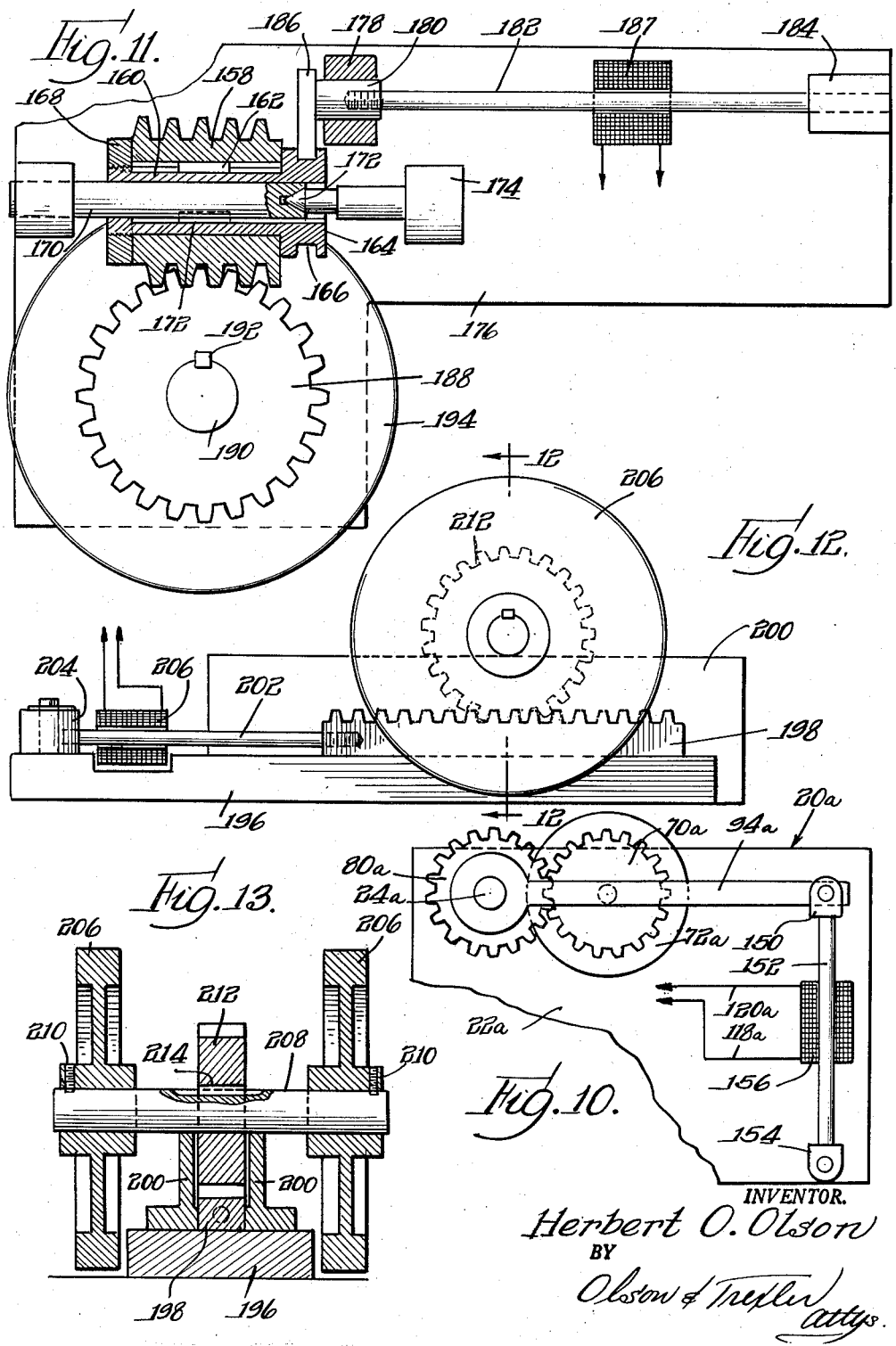

United States Patent Office 2,952,067
Patented Sept. 13, 1960

2,952,067

GEAR FINISHING MACHINE AND METHOD

Herbert O. Olson, 1527 9th Ave., Rockford, Ill.

Filed May 26, 1954, Ser. No. 432,529

5 Claims. (Cl. 29—90)

This invention is concerned with gear forming, and is more particularly concerned with the finishing of the contacting or bearing surfaces of gears.

Gears are conventionally cut from gear blanks by gear hobs which are constructed in accordance with any of a great number of formulae including cycloidal, involute, and others in accordance with the type of gear to be produced, and the use to which the gear is to be put. Gear hobs form the gears by cutting or scraping away the metal. All cutting or scraping away of metal, including gear hobbing, is essentially a tearing process. Thus, although a finished metal surface, such as a gear bearing surface, may appear to be quite smooth, it is actually rough. The surface may be seen with a microscope to be comprised of hills and valleys.

More specifically, the accuracy of tooth profile in gear hobbing is limited by at least three important factors. First, the hob usually has six gashes which provide the cutting edges on the leading side of each tooth. In the case of a single thread hob, six teeth cut for each gear tooth that is indexed. This causes the cutting edge to pass the cutting plane six times making six gouging gashes. Between each one of these six tooth cuts the gear is uniformly indexed. Therefore, approximately three gouges will show on each side of the tooth, starting at the top side of the working surface and ending at the lower edge. While this uniform indexing is taking plate there will also be a feed increment equal to the feed in thousandths inches per revolution of hob divided by the number of gashes in the hob. This increment spaces the gouges made by the cone-like surface of the hob tooth of revolution. Between the gouges are the ridges formed by the intermittent gouges. The intermittency is caused by the spaces or voids between the hob teeth. Both the index and the feed increments continue to keep up their timed inter-relationship whether a cut is made or not. Obviously, a gouge can only be made when one of the six teeth reaches the maximum depth of the tooth cut. A hob with an unlimited number of teeth would generate a perfect involute, but it cannot be made.

Secondly, accuracy of tooth profile is impossible because of the tearing of metal fibers that is characteristic of all cutting tools. Even with the keenest of cutting edges considerable pressure is required to cause the edge to penetrate to the depth of the cut each time the tooth enters the metal. These pressure surges cause deflections of the arbor and consequent variations of cutting depth. Variations of hardness in various areas of the gear will cause varying deflections of the hob arbor and compression in the tooth being cut. Thus it may be seen that microscopic ripples are left on the working surface of the gear tooth, besides a maze of fibers not smoothly shorn from the gear blank. These cause errors of profile and roughness of surface which increase friction and consequent wear. This further leads to impacts in the mating gears which increase materially as the speed increases. These impacts not only cause stresses and wear, but also cause non-uniform rotation of the driven gear.

Added to this, the fibers on the tooth surface cause metal to metal contact between the teeth which through the interlacing effects destroy the lubrication film in transmission gears.

Commercially the hobbing process is not to be criticized for the quick removal of metal and the finishing of teeth to a certain level of perfection. To generate from this state toward a level of perfection, it is desirable to use a method that will shape the tooth profile in a manner that follows the definition of the true involute or other shape in accordance with the formula to which a gear is being formed.

Conventional cutting processes cannot generate continuously due to the limited number of cutting teeth that can remove the metal on the tooth working surfaces. The continuous rolling index action of the gear and the related feeding action of the cutting tool demand continuous cutting for pure generation. Intermittent cutting is the best that can be obtained in hobbing, cutting or shaping of gear teeth in accordance with the teachings of the prior art. Thus it may be seen that cutting processes are limited in generative control.

In short, the microscopic hills and valleys present in even finely finished products resist relative sliding between mating bearing surfaces such as those in gears. This prevents smooth action of the gears and results in an appreciable power loss. Furthermore, it leads to short life of the gears as the hills and valleys of the mating surfaces tend to entangle and to tear pieces of metal from one another.

It is an object of this invention to provide an apparatus for and method of finishing the bearing surfaces of gears to a higher degree than heretofore thought possible.

Another object of this invention is to provide an apparatus for and method of simultaneously finishing the bearing surfaces of a pair of mating gears.

It is an object of this invention to produce finely finished bearing surfaces by removing the tops of the high spots or "hills" produced by conventional machining practices.

A further object of this invention is to provide an apparatus for and method of hammering the bearing surfaces of gears to produce an extremely fine finish.

More specifically, it is an object of this invention to provide an apparatus for and method of hammering together the bearing surfaces of a gear and a mate which may be a master or a mating gear to produce an extremely fine finish on the bearing surfaces.

Other and further objects and advantages of the present invention will be apparent from the following description when taken in connection with the accompanying drawings wherein:

Fig. 1 is a top plan view of an apparatus incorporating the principles of the invention;

Fig. 2 is a side elevational view thereof;

Fig. 3 is a top sectional view along the line 3—3 in Fig. 2 showing some of the constructional details;

Fig. 4 is a fragmentary vertical sectional view taken substantially along the line 4—4 in Fig. 2;

Fig. 5 is an enlarged fragmentary plan view showing the mating of a pair of gears;

Fig. 6 is a greatly magnified sectional view of the surface of a gear after hobbing thereof;

Fig. 7 is a similar view following the finishing thereof in accordance with the principles of this invention;

Fig. 8 is a cross-sectional view on a greatly enlarged scale showing the mating of a pair of bearing surfaces finished in accordance with the principles of this invention;

Fig. 9 is a side view showing how conventional machining fails to produce an absolutely smooth finished surface;

Fig. 10 illustrates a modification of the vibrating means;

Fig. 11 illustrates a modification of the invention employing a master, or for finishing a worm and wheel;

Fig. 12 illustrates a further modification for finishing a rack and pinion; and

Fig. 13 is a cross-sectional view taken along the line 13—13 in Fig. 12.

This invention contemplates the provision of an apparatus and method for effecting what I like to call generative peening and compressive generation. In accordance with the principles of this invention, the bearing or working surfaces, generally comprising the faces and flanks, of a pair of mating gears are hammered together, or similar surfaces of a master and a gear are hammered together. Such hammering is effected very rapidly at frequencies up to several thousand per second and perhaps extending into supersonic frequencies, and each blow is of rather small magnitude.

The forces acting on the working or bearing surfaces of gears being finished in accordance with the principles of my invention are such as to cause ultimate compressive stresses on the small areas that actually contact after conventional hobbing. These areas are quickly increased until a smooth profile conforming substantially perfectly to an involute or other gear formula. These final areas are produced by millions of tiny hammer blows on the working surfaces of the teeth tangent to the base circle of the gear. Consequently, perfect generation results.

After generative peening the action of the gear teeth is that of pure rolling. Uniform rotation of the driven gear results accompanied by elimination of impacts and consequent accelerations and decelerations of the driven mechanism. Backlash is greatly reduced, making for quiet running gears and higher speed operation. Friction is at a minimum since the working surfaces have a glass-like finish.

The gear finishing apparatus shown in Figs. 1 and 2 and generally identified by the numeral 20 comprises a base 22 of relatively great mass to resist vibration. A shaft 24 upstands from the base 22 and is shouldered at 26 to provide a reduced diameter portion 28. A sleeve 30 is rotatably journaled on the reduced diameter portion 28 and is held thereon by a washer 32 which in turn is held down by a bolt or screw 34 threaded into the top of the reduced diameter portion 28.

A sleeve 36 is rotatably journaled on the shaft 24, and a sprocket 38 is fixed thereon or is formed integral therewith. A ball thrust bearing 40 supports the sleeve 36 and sprocket 38. An arm 42 projects radially from the sleeve 36 and is provided with a ring-like portion 44 fitting around a reduced upper section of the sleeve 36 and secured thereto by means such as a screw 46 fitting through a radial aperture in the ring 44 and threaded into the sleeve 36. A substantially similar arm 48 is rotatably journaled on the upper sleeve 30 by means of a ring-like portion 50 on the arm. Similar bearing blocks 52 (Figs. 2-4) are mounted in suitable elongated openings 54 in the arms 42 and 48 by means such as dovetail slides 56. Screws 58 are threaded through the ends of the arms 42 and 48 and abut the bearing blocks 52, and opposed screws 60 are threaded through the arms oppositely thereto from openings 62 therein and abut the bearing blocks 52.

A shaft 64 is journaled in the bearings 52 and is held against vertical movement therein by a bolt 66 passing through a washer 68 and threaded into the upper end of the shaft, as most clearly may be seen in Figs. 2 and 4. A gear 70 to be finished is keyed on the shaft 64 as at 71 for rotation therewith between the arms 42 and 48, and readily removable from the shaft by removing the bolt 66 and sliding the shaft axially downwardly. A flywheel 72 is keyed on the bottom of the shaft 64 as at 74 and is supported on the shaft by a bolt 76 passed through a washer 78 and threaded into the end of the shaft. The flywheel 72 serves to impart high inertia to the shaft 64 and gear 70 to be finished as will be apparent shortly.

The second gear to be finished, and preferably the one to be mated with the gear 70 in operation, is identified by the numeral 80 and is keyed on the upper sleeve 30 on the reduced diameter portion 28 of the shaft 24 as indicated at 82. The shaft 64 is spaced a proper distance from the shaft 24 for the gears 70 and 80 to mesh, preferably with the teeth thereof meeting along their respective pitch lines, although this is not uniformly true as will be pointed out hereinafter.

A drive motor 84 of any suitable reversing type to balance gear finishing by running in opposite directions is connected through a suitable speed change mechanism such as a variator 86 which has an output shaft 88 carrying a sprocket 90. A sprocket chain 92 drives the sprocket 38 from the sprocket 90 whereby to rotate the sleeve 36. This causes rotation of the arm 42 and causes the gear 70 to move as a planet gear around the gear 80 as a sun gear, one rotational position being shown in dashed lines in Fig. 3. It will be understood that the arms carrying the gear 70 will rotate through one or more complete revolutions, and that the dashed line position shown as merely illustrative of the myriad positions possible.

A relatively long arm 94 is mounted on the upper sleeve 30 and is keyed thereto by means such as a key 96. This long arm 94 is held down by the aforementioned washer 32 and bolt 34. The arm 94 is provided at its outer or free end with a portion 98 which may be depending and of reduced width. The depending portion 98 is made of magnetically susceptible material and may be formed integral with the arm 94, or may be a separate piece attached thereto. A pair of electromagnets 100 is supported on opposite sides of the magnetic portion 98 by suitable brackets 102 mounted on the massive base 22.

A motor 104 acts through a suitable speed change mechanism such as a variator 106, and a sprocket chain 108, to drive an alternating current generator 110. One side of the generator 110 is connected by means such as a wire 112 to a frequency multiplier 114, and this frequency multiplier in turn is connected to an amplifier 116. The variator provides for the generation of a large range of frequencies by the generator 110 and frequency multiplier. It will be understood that the motor 104, variator 106, generator 110, and frequency multiplier 114 could be replaced by a suitable variable frequency oscillator. The amplifier 116 is provided with suitable adjustable impedance matching means controlled by a knob 117 or the like. The other side of the generator is connected by means such as a wire 118 to the frequency multiplier, and through the frequency multiplier to the amplifier 116. The output terminals of the amplifier are connected by means of the wires 118 and 120 to the electromagnets 100, and a wire 122 interconnects the electromagnets. The electromagnets thus are energized in series with alternating current, and are so connected as to be of opposite polarity, thereby causing the arm 94 to vibrate back and forth between the electromagnets.

The motor 84 acts through the variator 86, and the sprocket chain 92 and associated sprockets to rotate the arm 42, and hence the gear 70 being tested, about the shaft 24, 28. This movement of the first gear 70 being finished as a planet gear about the second gear 80 being finished, which acts as a sun gear, causes the teeth of the gear to mesh as they would in use, since the sun gear 80 is locked against rotation. The vibration of the arm 94 back and forth under the influence of the electromagnets causes the sun gear 80 to vibrate angularly and this causes the mating or driving surfaces of the gears 70 and 80 to hammer against one another whereby to reduce the high spots or "hills" on these mating or driving surfaces. The blows of such hammering are generally tangent to the base circle and normal to the working surface, say the involute in an involute gear. This tends to perfect the tooth curve. Each mating or driving surface is technically made up of two parts, namely, the face and the flank. These two portions together will hereinafter be referred to as working surfaces or bearing surfaces.

Fig. 5 illustrates the manner in which the working surfaces 124 and 126 of the gears 70 and 80 mate with one another. Preferably their pitch lines 128 and 130 meet with one another, but it will be appreciated that the gear teeth could be made slightly over-size and the shaft 64 on which the gear 70 is mounted could be moved outwardly slightly through the slidable bearing block arrangement until the gears have been partially finished. The bearing blocks then could be adjusted to cause the gears to meet along their pitch lines as shown in Fig. 5 for final finishing. It will be appreciated that the working surfaces 124 and 126 progressively engage along substantially their entire lengths, and that the trailing working surfaces 124a and 126a engage as well as the driving working surfaces 124 and 126 and are hammered by the vibration imparted to the sun gear 80. The large flywheel or mass 72 fixed on the axis of the planet gear maintains this gear in steady movement without allowing it to vibrate back and forth angularly in response to the impacts dealt it by the gear 80.

The profile of one of the working surfaces, as 124, is shown on a very greatly magnified scale in Fig. 6. The roughness of an apparently finely finished surface may be seen, and consists of alternate high spots or "hills" 132 and low spots or "valleys" 134. Obviously, two such surfaces cannot slide over each other with great facility. In fact, a sliding motion between two such surfaces causes the opposing "hills" to snag or entangle with one another, causing further tearing of the metal. Thus, the surfaces of gears produced according to conventional practice never do become completely finished, and are worn out too soon.

For maximum efficiency of operation the variator 106 (or the oscillator if one is used) is adjusted to cause the entire vibrating system including the gear to be finished and the arm 94 to vibrate at the natural frequency of vibration of this system. The amplifier then is adjusted for electrically matching the impedance presented by the magnets in order to obtain a maximum transfer of energy to the vibrating system, and hence to the gears being finished.

In accordance with the practice of my invention, there is no tearing of the metal as there is according to conventional practices. The hammering of the mating tooth working surfaces together as heretofore described flattens the tops of the "hills" as indicated at 136 in Fig. 7. The "valleys" 134 remain as before, but do no harm as they are depressed beneath the bearing surfaces. As shown in Fig. 8, two of the finished working surfaces 124 and 126 mate or coact with the flattened "hill" tops 136 and 138 in engagement. These flattened "hill" tops are practically perfectly finished and there is a smooth sliding and rolling engagement between the gear teeth without any catching, binding, or tearing. The gears thus have very low power losses due to friction, and the life of the gears is greatly increased.

It has been noted heretofore that conventional machining produces irregular surfaces. The reason why such irregular surfaces are produced is illustrated in Fig. 9. A cutting tool 140 having a cutting or working edge 142 is shown in finishing or machining engagement with a work piece 144. Obviously, the cutting edge 142 of the tool cannot be as wide as the work piece 144. Consequently, the tool cuts a groove 146 which is substantially complementary in shape to the tool. The piece of metal being shaved from the work piece 144 must be torn therefrom along the cutting edge 142 of the tool, and also at the corners as indicated at 148. These torn surfaces necessarily are rough as previously described with regard to Fig. 6, and it is practically impossible to cause the tool 140 to cut successive grooves of exactly the same depth and just exactly meeting edge to edge. It will be apparent that lapping of the grooves would cause further tearing of the metal.

A modification of the means for effecting the hammering is shown in Fig. 10. Certain of the parts in this modification are similar to those previously described, and similar numerals will be used with the addition of the suffix a. The gear finishing apparatus 20a shown in Fig. 10 comprises a massive base 22a on which a pair of gears 70a and 80a which are to be finished are mounted in the manner previously described, the gear 80a being mounted on the shaft 24a, and the gear 70a being carried from the arm 94a and having a massive flywheel 72a fixed for rotation therewith.

The end of the rod 94a is pivotally connected by a non-magnetic connector 150 such as a yoke to an elongated magnetostriction rod 152. The opposite end of the magnetostriction rod 152 is anchored by a non-magnetic member 154 to the massive base 22a. A coil 156 having a high field strength encircles the magnetostriction rod 152 intermediate its ends and is connected by means of wires 118a and 120a to the amplifier or other source of oscillations. The magnetostriction rod by way of example may be of approximately 50% nickel and may be of approximately 10 to 12 inches long. The variation in length of the magnetostriction rod 152 may amount to several thousandths of an inch with each cycle of the electrical oscillations applied to the coil 156. These frequencies preferably will be on the order of several thousandths per second and may extend up into supersonic frequencies.

My invention also is applicable to the finishing of gears by a master toothless hob, and the same principles may be applied to finish a worm and worm wheel. As shown in Fig. 11, a toothless vibratory hob 158 is mounted on a hob sleeve 160, being keyed thereto by means such as a key 162. The hob sleeve is provided with a head 164 having an annular groove 166 therein. A nut 168 threaded on to the end of the hob sleeve clamps the toothless hob 158 against the head 164. The sleeve 160 is slidably mounted on a hob spindle 170 and is fixed for rotation therewith by means such as a key 172. The hob spindle 170 is supported at the left end as shown in Fig. 11 for driving by any conventional means, and the right end is supported by a center 172 extending from a support 174 on a massive base 176.

A slide bearing 178 is mounted on the base 176 near the head 164, and slidably supports a cylindrical member 180 which is threadedly or otherwise affixed to one end of a magnetostriction rod 182, the other end being anchored by a fixture 184 to the base 176. The fixture 184 and the slug 180 both preferably are formed of non-magnetic material. The slug 180 carries an arcuate yoke 186 which may be integral with or fixed to the slug, and this yoke is provided with a pair of arms (not shown) which ride in the groove 166. A coil 187 encircles the magnetostriction rod 182 and is connected by suitable wires to the amplifier or other source of electrical oscillations.

The gear to be finish hobbed is indicated at 188, being supported on an arbor 190 and keyed thereto at 192. The arbor 190 is supported from the massive base 176 and a massive flywheel 194 is keyed to the arbor 190 beneath the gear 188 for damping oscillation of the gear 188 in the same manner as previously described. The hob spindle 170 is rotated slowly by suitable means, and this rotates the toothless hob 158 to drive the gear 188, the latter having been prehobbed in accordance with conventional hobbing practice. This causes the toothless hob to rub and press some of the high spots of the gear down, thus effecting what I call compressive generation. The coil 187 is energized with high frequency oscillations and this causes the magnetostriction rod 182 to shorten and elongate, thus acting through the yoke 186 and hob sleeve 160 to vibrate the hob 158, thereby hammering the working surfaces of the gear 188 to eliminate the high spots completely, thus effecting what I call generative peening. It will be apparent that the same apparatus and method could be applied simultaneously to finish a mating worm and worm wheel.

A rack and gear also can be finished in accordance with the principles of my invention as illustrated in Figs. 12 and 13. A massive base 196 is provided, and a rack 198 is slidably mounted thereon between a pair of parallels or rails 200. A magnetostriction rod 202 is threaded into or otherwise secured to one end of the rack 198, and the other end of the magnetostriction rod is anchored by means of a non-magnetic anchor 204 to the base 196. A coil 206 similar to those previously described and having a high field strength encircles rod 202 intermediate its ends and is provided with suitable wires leading to the amplifier or other source of electrical oscillations.

A pair of flywheels 206 is mounted on opposite ends of an arbor 208 by any suitable means such as set screws 210 threaded through the hubs of the flywheels and bearing against flats or otherwise fitting into depressions in the arbor 208 to lock the flywheels to the arbor for rotation therewith. The gear 212 to be finished is mounted on the arbor 208 for rotation therewith by means such as a key 214, and the gear is arranged to mesh with the rack when the arbor is rolled along the rails or parallels 200. Lengthening and shortening of the rod 202 in response to energization of the coil 206 causes the teeth of the rack to hammer against the teeth of the gear 212 in a manner similar to that previously disclosed.

The apparatus for and method of finishing gears as hereinabove shown and described produces more finely finished bearing surfaces or working surfaces than heretofore thought possible. The hammering action causes these surfaces to flatten out without the cutting and tearing associated with conventional machining operations. Accordingly, the gears so produced are more efficient in operation and have a much longer service life than conventional gears.

The particular embodiments of my invention herein shown and described are for illustrative purposes only. Various changes may be made therein and form a part of my invention insofar as they fall within the spirit and scope of the appended claims.

I claim:

1. An apparatus for finishing gears which comprises a base means, first work gear support means including a shaft, a gear oscillating member mounted on said shaft and oscillatable about the axis thereof and a rotating member mounted on said shaft, a second workpiece gear support means including an axis spaced from said shaft and mounted on said rotating member, and an oscillating means mounted on said base and connected to said gear oscillating member for oscillating said gear oscillating member while the second support is rotated about said shaft to hammer working surfaces of gears to be mounted on said supports.

2. Apparatus as set forth in claim 1 wherein the said second support means includes an arm radially disposed of the other said support means and wherein the said oscillating means includes a rod extending from said gear oscillating member to vibrating means mounted on said base.

3. Apparatus in claim 2 wherein one end of said rod comprises magnetically susceptible material and the vibrating means comprises a pair of electromagnets alternately operative on either side of said one end to effect oscillation of said gear oscillating member.

4. Apparatus of claim 2 wherein the said vibrating means comprises a magnetostrictive device attached to said rod and said base.

5. Apparatus of claim 2 wherein a heavy mass is included with said second support means to inhibit oscillation of a workpiece about the said axis thereof.

References Cited in the file of this patent

UNITED STATES PATENTS

| | | |
|---|---|---|
| 1,154,830 | Alquist | Sept. 28, 1915 |
| 1,796,484 | Slade | Mar. 17, 1931 |
| 2,325,237 | Falk | July 27, 1943 |
| 2,658,259 | Aldino et al. | Nov. 10, 1953 |